United States Patent [19]
Mikami et al.

[11] Patent Number: 5,953,048
[45] Date of Patent: Sep. 14, 1999

[54] VIDEO TELEPHONE

[75] Inventors: Shinichi Mikami; Naoki Tamada, both of Saitama; Kunio Nagai, Tokyo; Akira Yamazaki, Chiba, all of Japan

[73] Assignee: Sony Corporation, Tokyo, Japan

[21] Appl. No.: 08/968,116

[22] Filed: Nov. 12, 1997

[30] Foreign Application Priority Data

Nov. 16, 1996 [JP] Japan ............................ P08-321000

[51] Int. Cl.⁶ ............................ H04N 7/14; H04M 1/00
[52] U.S. Cl. .............................................. 348/14; 379/428
[58] Field of Search ........................ 348/10–17, 19–20; 379/93.17, 93.21, 202, 428; 345/905; 248/917–925

[56] References Cited

U.S. PATENT DOCUMENTS

| | | | |
|---|---|---|---|
| 4,715,059 | 12/1987 | Cooper-Hart et al. ................. | 348/20 |
| 5,374,952 | 12/1994 | Flohr ........................................ | 348/15 |
| 5,541,640 | 7/1996 | Larson ...................................... | 348/19 |
| 5,575,450 | 11/1996 | Lee ........................................... | 248/923 |
| 5,585,839 | 12/1996 | Ishida et al. ............................. | 348/14 |

*Primary Examiner*—Curtis A. Kuntz
*Assistant Examiner*—George Eng
*Attorney, Agent, or Firm*—Jay H. Maioli

[57] ABSTRACT

A video telephone (1) includes a communication block (2) having a telephone communication function and a display block (3) assembled so as to be mounted on the communication block (2) and having a television function. The display block (3) includes a display screen (4) and a television camera. The display block (3) can be adjusted in tilt with respect to the communication block (2).

6 Claims, 12 Drawing Sheets

VIDEO TELEPHONE

BACKGROUND OF THE INVENTION

The present invention relates to a video telephone which includes a video telephone function.

In recent years, a video telephone which includes a video telephone function has been made practical.

Specifically, the video telephone has a function of receiving and transmitting a pictorial image taken by a video camera in a real time via a telephone line so that a user can see the pictorial image with use of a display screen, in addition to an ordinary voice telephone function.

Conventionally, this type of video telephone has one block structure such that a telephone communication function section and a television (video) function section are assembled into one housing. For this reason, the directions of the display screen and the video camera has not been changed.

Thus, the aforesaid conventional video telephone is inconvenient for a user in practical use; and hence, preferable improvement of the video telephone has been desired.

SUMMARY OF THE INVENTION

Taking such circumstances into consideration, it is an object of the present invention to provide a video telephone which a user can easily operate.

To achieve the above object, the present invention provides a video telephone having a video telephone function, comprising:

a communication block having a telephone communication function; and a display block assembled so as to be mounted on the communication block and having a television function, the display block comprising a display screen and a camera, wherein the display block can be adjusted in tilt with respect to the communication block.

With the constitution as described above, the user can freely adjust directions of the display screen and the video camera; and therefore, the video telephone is very convenient for the user.

BRIEF DESCRIPTION OF THE DRAWINGS

FIGS. 12A and 12B are perspective views used to explain a lens opening and closing operation, wherein FIG. 12A shows a lens which is in its opened state, and FIG. 12B shows a lens which is in its closed state.

DETAILED DESCRIPTION OF THE PREFERRED EMBODIMENTS

Figure 1:
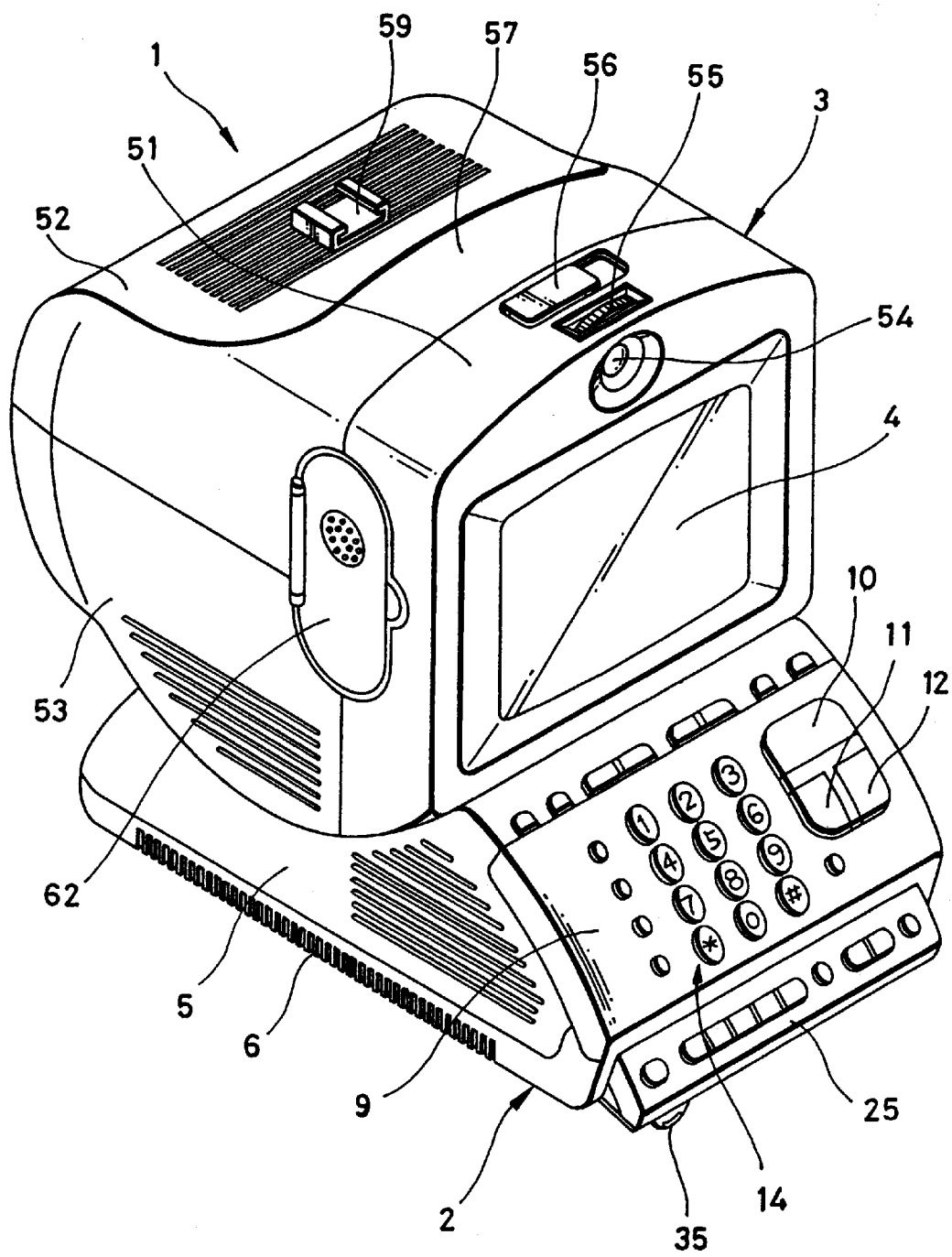
FIG. 1 is a perspective view of a video telephone according to the present invention.
Figure 2:
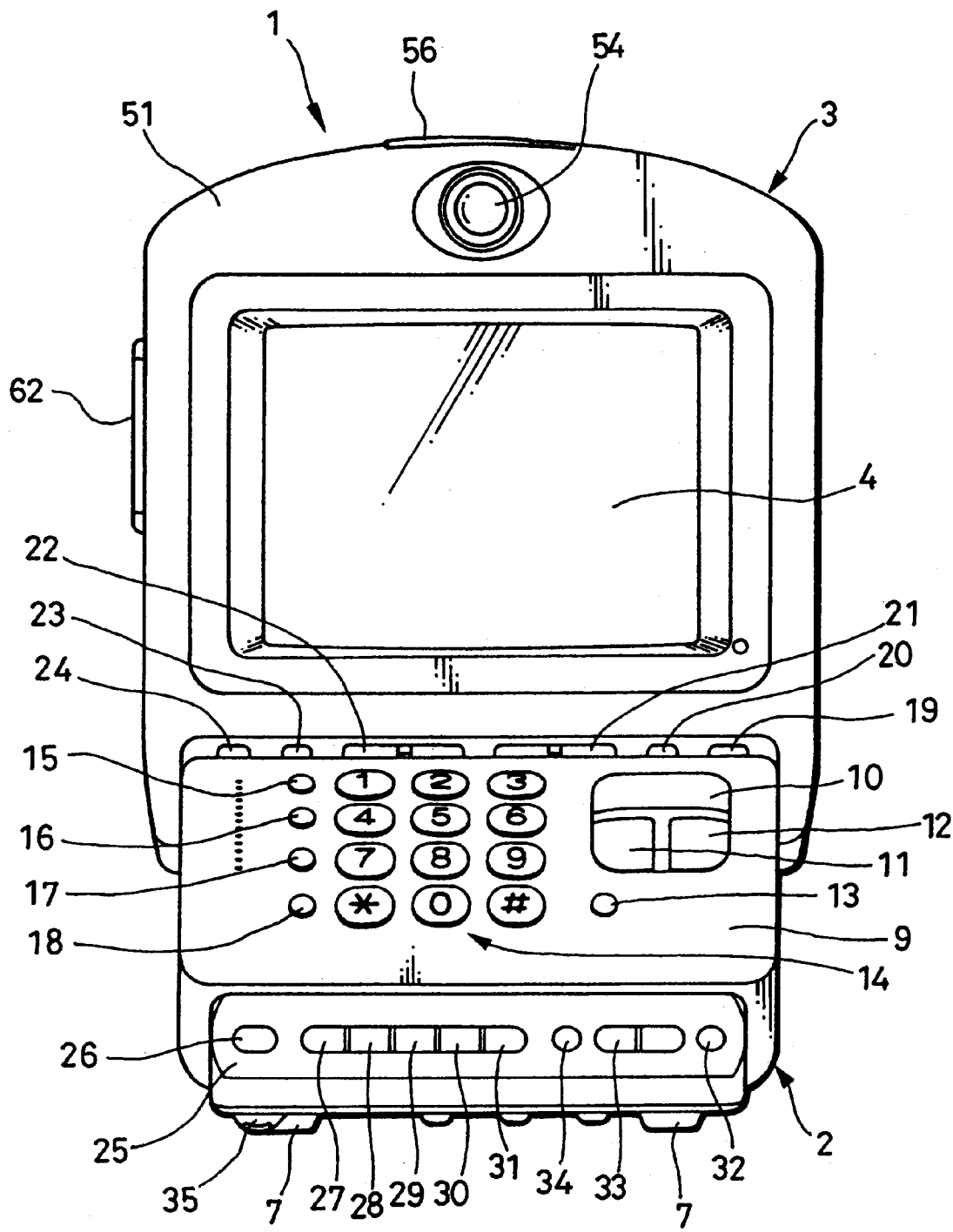
FIG. 2 is a front view of the video telephone according to the present invention.
Figure 3:
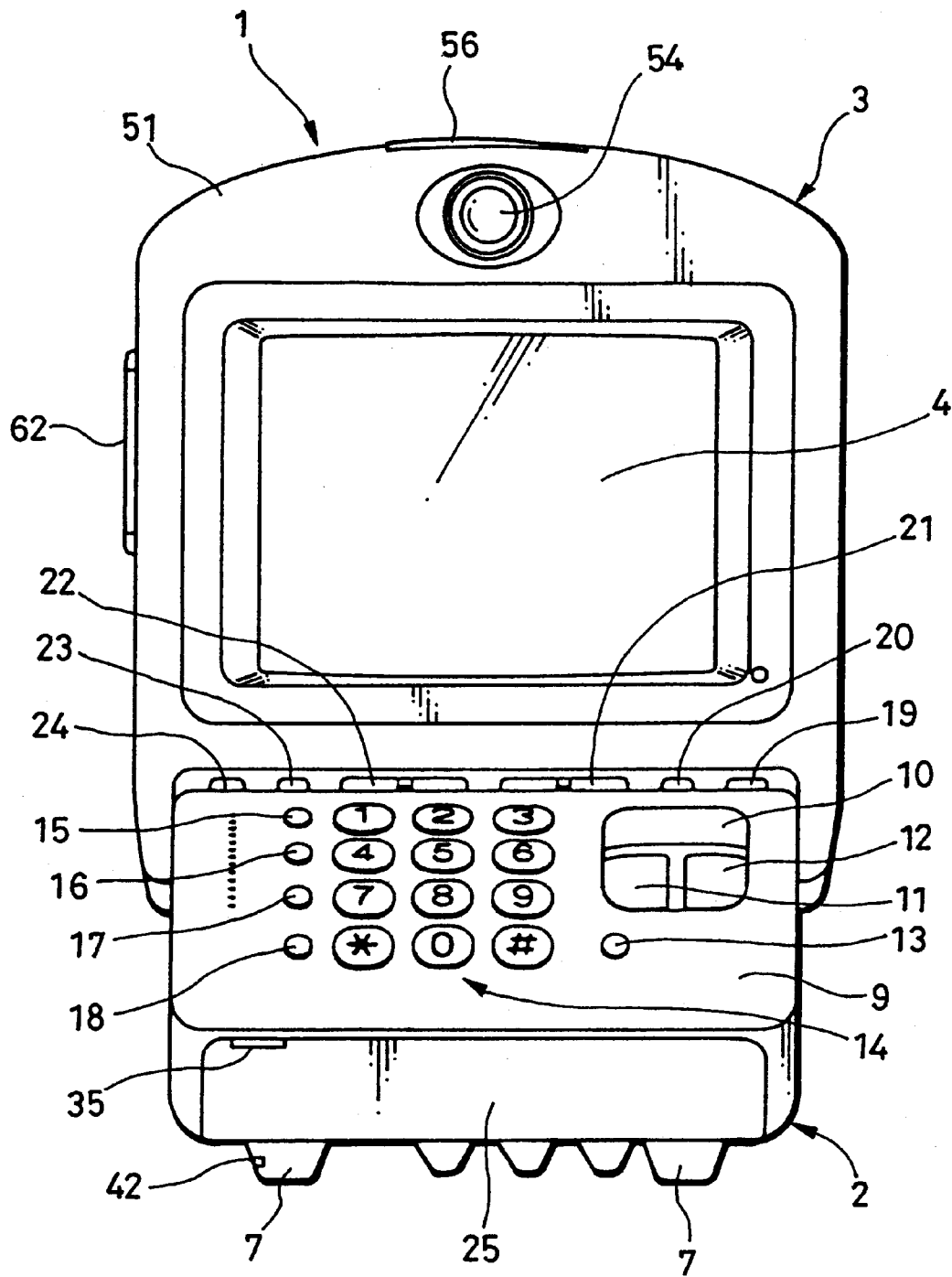
FIG. 3 is a front view of the video telephone according to the present invention with a sub control box being housed therein.
Figure 4:
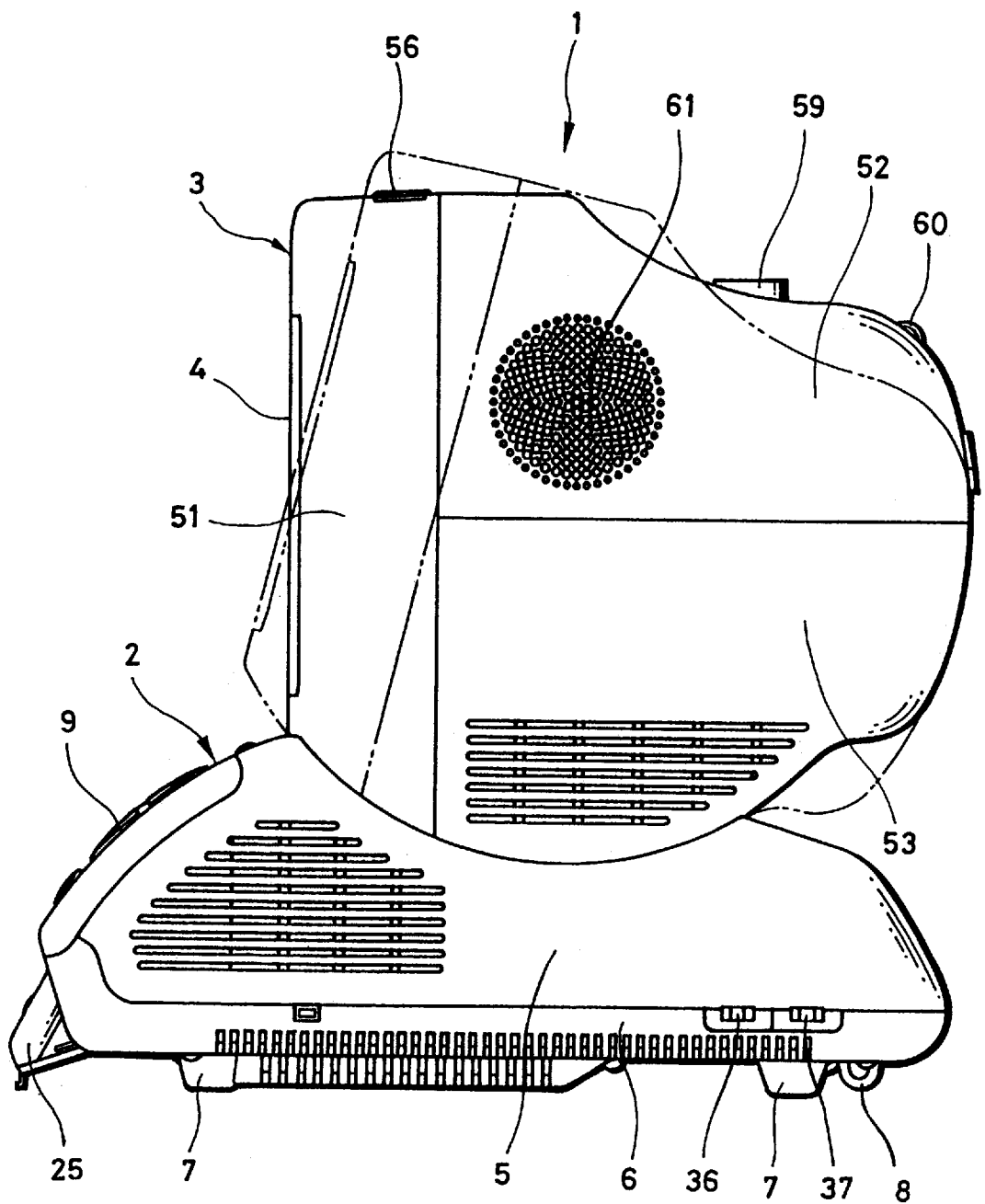
FIG. 4 is a right side view of the video telephone according to the present invention.
Figure 5:
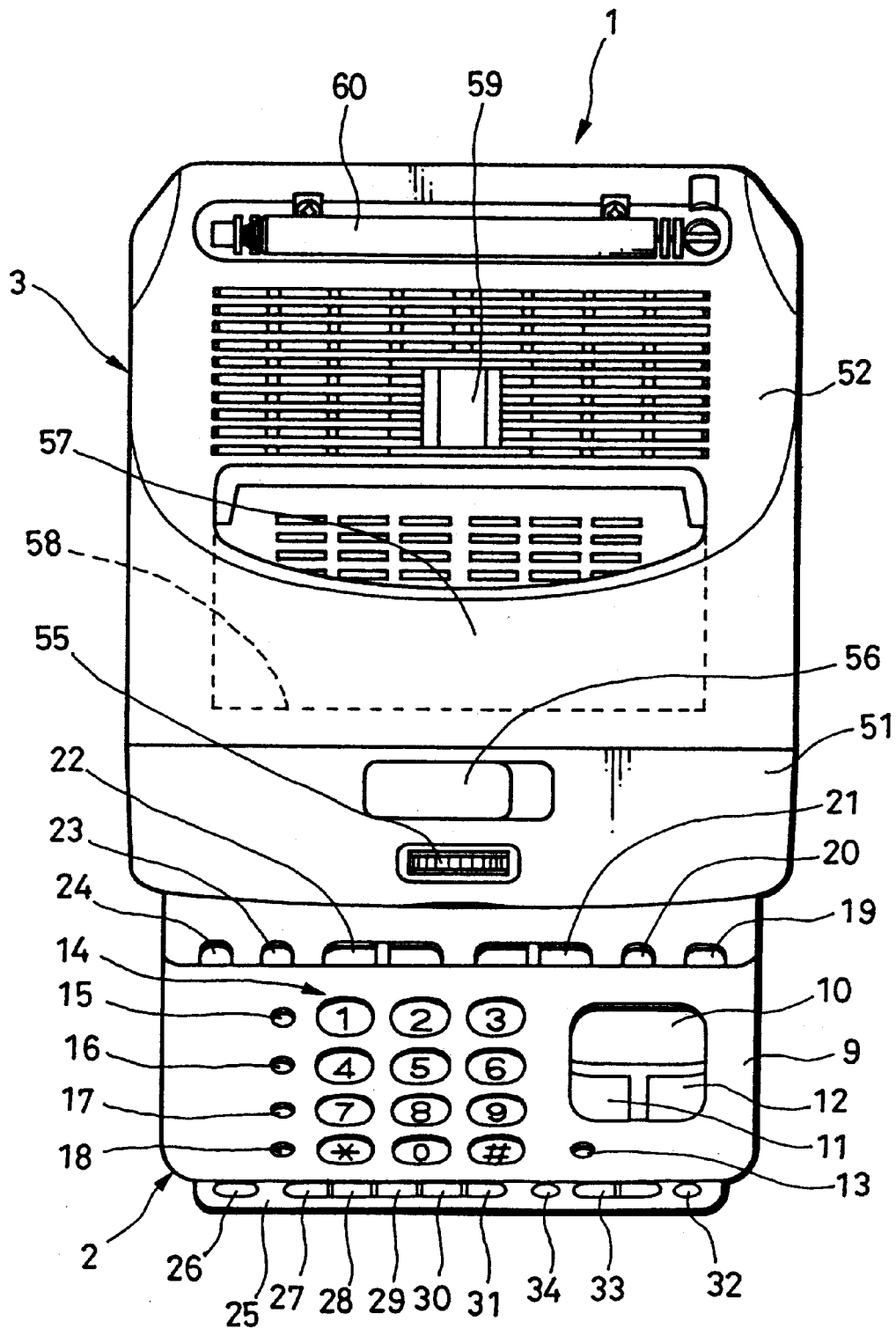
FIG. 5 is a top plan view of the video telephone according to the present invention.
Figure 6:
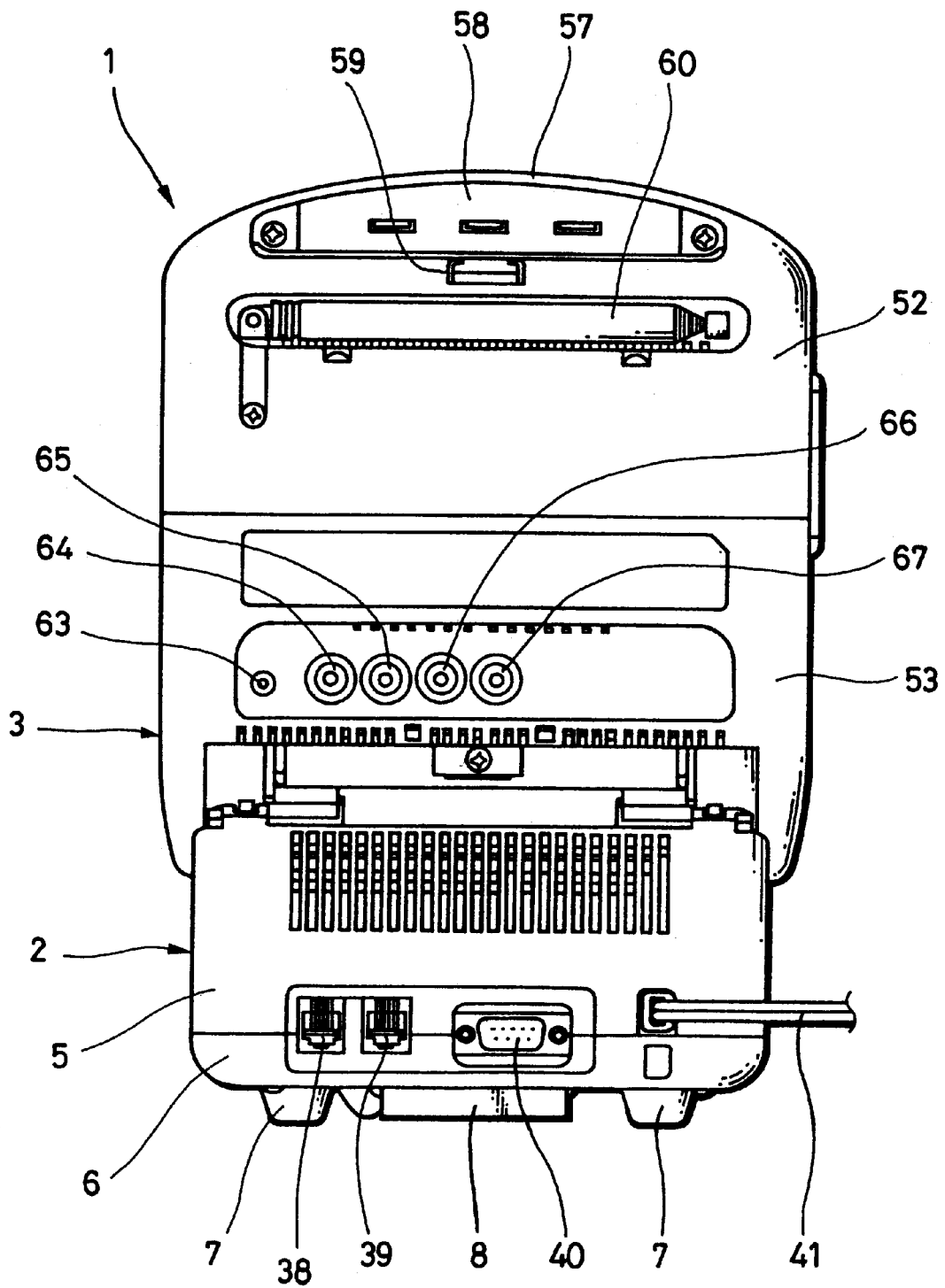
FIG. 6 is a rear view of the video telephone according to the present invention.

The preferred embodiments of the present invention will be described below in detail with reference to the accompanying drawings.

In FIG. 1 to FIG. 6, reference numeral 1 designates the whole of a video telephone.

The video telephone 1 has a video telephone function, that is, a function of receiving and transmitting a pictorial image taken by a video camera in a real time via a telephone line so that a user can see the pictorial image with use of a display screen, in addition to an ordinary voice telephone function. Further, besides the telephone, the video telephone receives a general television broadcasting so that a user can see the received television broadcasting with use of the display screen. In addition, the video telephone 1 has a so-called hands-free telephone function. Specifically, the user can make a telephone call without using a telephone transmitter-receiver.

The video telephone 1 comprises a communication block 2, and a display block 3 which is assembled so as to be mounted on the communication block 2.

The communication block 2 mainly has a telephone communication function; on the other hand, the display block 3 mainly has a television (video) function, and is equipped with a display screen 4 at its front surface.

First, the communication block 2 will be explained below in detail. An outer housing of the communication block 2 comprises an upper housing 5 and a lower housing 6 which are both made of a resin material such as ABS or the like and assembled each other. An interior of the outer housing of the communication block 2 is equipped with various electronic circuit boards including mainly a telephone communication electronic circuit board.

A bottom surface of the lower housing 6 is provided with leg portion 7 projected therefrom. These leg portion 7 are located two by two on right and left at front and rear of the bottom surface, that is, four in total. Further, a rear portion of the bottom surface is provided with a projected portion 8 through which an antitheft wire or the like is inserted and engaged.

A front surface of the communication block 2 is provided with a control panel 9. The control panel 9 is inclined at a steep angle, for example, at an angle of about 45°, and is formed into a gently circular-arc shape. Further, the control panel 9 is provided with various operation buttons.

Also, on a middle portion of the control panel 9 there are provided a video telephone button 10 a telephone call button 11 and an end button 12 and a video telephone monitor button 13, relative to a telephone communication function, a dial button group 14, a catch phone button 15, a phone book button 16, a redial/pose button 17, and a reserve button 18.

In order to facilitate an operation of the following buttons, in particular, the video telephone button 10, the telephone call button 11 and the end button 12, are formed larger as compared with other buttons because these buttons have high frequency in use. Also, these three buttons are formed like a shape of being combined into one.

An upper portion of the control panel 9, that is, a portion directly under the display screen 4 of the display block 3 is provided with the following operation buttons, relative to the television function, specifically, a television screen on/off button 19 a screen display button 20, a channel selective button 21, a volume control button 22, an input switching button 23, and a brightness on/off button 24.

Moreover, the front surface of the communication block 2 is provided with a sub control box 25 which is situated below the control panel 9. The sub control box 25 is provided with the following buttons having a relatively low frequency in use; specifically, a picture quality control button 26, a still picture (image) on/off button 27, a still picture call button 28, a still picture reserve button 29, a still picture preview button 30, a still picture transmission button 31, a menu call button 32, a menu selective button 33, and a menu determination button 34.

The sub control box 25 is pushed into the communication block 2 by rotation so as to be housed therein. Specifically, the sub control box 25 is housed so as to hide various buttons 26 to 34 provided thereon (see FIG. 3).

Further, the sub control box 25 is provided with a knob or handle 35. The handle 35 is used for pulling the sub control box 25 from a housed state by manually operating it.

Incidentally, the sub control box 25 is usually in a state of being housed.

A right-hand side surface of the communication block 2 is provided with a telephone bell volume changeover switch 36 and a dial mode changeover switch 37.

Moreover, a rear surface side of the communication block 2 is provided with a line connection jack 38, a telephone connection jack 39 and an RS-232C jack 40, and further, a power supply code 41 is led out therefrom.

A microphone for hands-free telephone call is built in the forward left-hand side leg portion 7 projected from the bottom surface side of the communication block 2. A voice during the telephone call is picked up by the microphone through a microphone hole 42 formed in the aforesaid leg portion 7.

Figure 7:
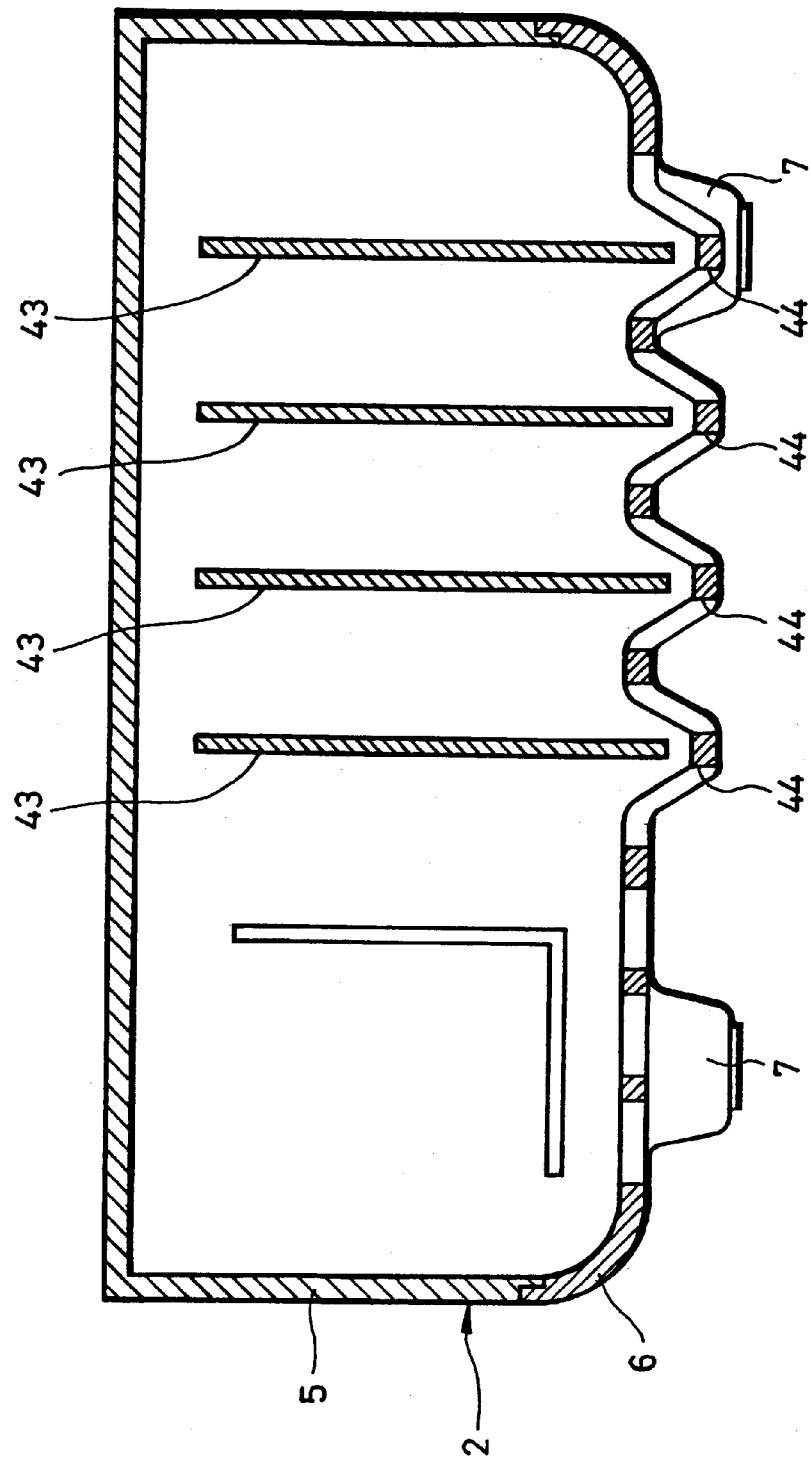
FIG. 7 is a view used to explain an arrangement of an electronic circuit board in a communication block.

In the interior of the communication block 2, electronic circuit boards are arranged as shown in FIG. 7. Specifically, rectangle-shaped electronic circuit boards 43 are disposed in a state of being vertically arranged. This serves to make a structure such that a projection area thereof is reduced. A bottom portion of the lower housing 6 is corrugated into a shape like a wave projecting downward by taking advantage of a space equal to a height of the leg portion 7 so as to correspond to these electronic circuit boards 43. This serves to sufficiently secure an area of each of the electronic circuit boards 43.

As described above, the bottom portion of the lower housing 6 is formed like a wave, so that a vent 44 bored through the wavy portion can be made long. Therefore, sufficient ventilation effect can be obtained.

Next, the following is a detailed explanation about the display block 3.

An outer housing of the display block 3 comprises a front surface housing 51, an upper housing 52 and a lower housing 53 which are situated at the rear side of the outer housing. These housings are each made of a resin material such as ABS or the like. A television electronic circuit board including a tuner and a CRT are housed in the interior of the outer housing of display block 3. The display screen 4 situated on the front surface of the CRT is exposed to the front surface of the display block 3 through an opening formed in the front surface housing 51.

Further, the display block 3 has a built-in video camera above the CRT. A lens 54 of the video camera is exposed to the front surface of the display block 3 through an another opening formed in the front surface housing 51 so that a user can be photographed by the video camera.

On an upper surface on the front side of the display block 3, a focus ring 55 for adjusting the focus of the lens 54 is exposed to the outside. Further, there is provided an operation member 56 for operating a lens cover to open and close the lens 54.

Moreover, the upper surface side of the display block 3 is formed with a hold portion 57. The hold portion 57 comprises a recess portion 58 which is formed on the upper housing 52 at a rear portion of the built-in video camera. When holding this video telephone, the user inserts his hand into the recess portion 58 so as to grasp the hold portion 57.

The rear portion of the upper housing 52 of the display block 3 is provided with a shoe base 59 for attaching a lighting appliance or the like and a rod antenna 60 for receiving a television broadcasting.

The right-hand side of the upper housing 52 of the display block 3 is formed with a speaker hole 61. That is, a speaker is located inside the speaker hole 61, and a sound from the speaker is outputted to the outside via the speaker hole 61.

The left-hand side of the display block 3 is provided with an earphone accommodation portion 62 for accommodating an earphone.

The rear side of the lower housing of the display block 3 is provided with an external antenna connection jack 63, external input terminals (sound, pictorial image) 64 and 65, and external output terminals (sound, pictorial image) 66 and 67.

In the video telephone 1 constructed as described above, the display block 3 is assembled so as to be adjusted in tilt (inclination) with respect to the communication block 2.

This display block 3 can be adjusted in tilt in a range from a state that the display screen 4 is faced in a vertical direction to a state that it is faced obliquely above, for example, in an angular range of 15°.

As described above, the display block 3 can be adjusted in tilt, so that the user can freely change the directions of the display screen 4 and the lens 54 of the video camera; therefore, the user can easily handle the display block 3 while it being convenient for the user.

Figure 8:
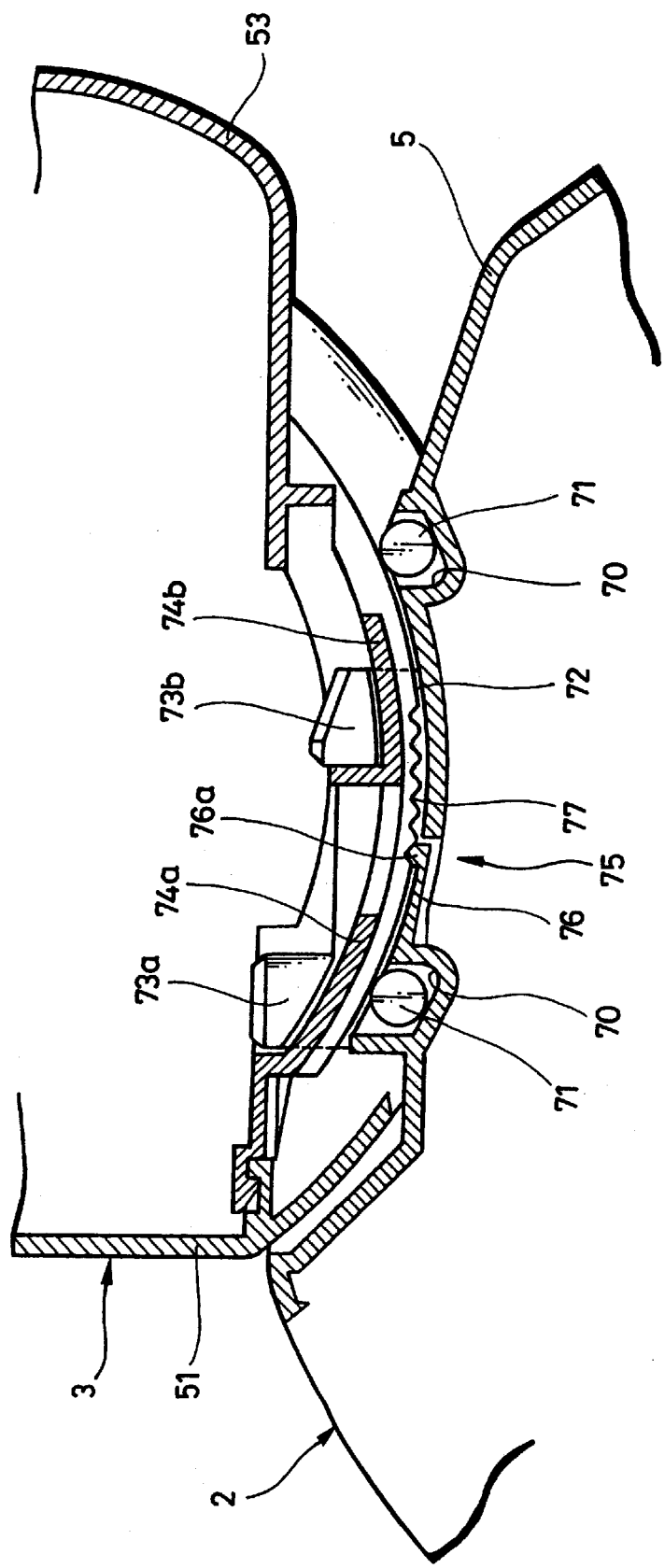
FIG. 8 is a longitudinally sectional side view of a tilt adjusting mechanism section.
Figure 9:
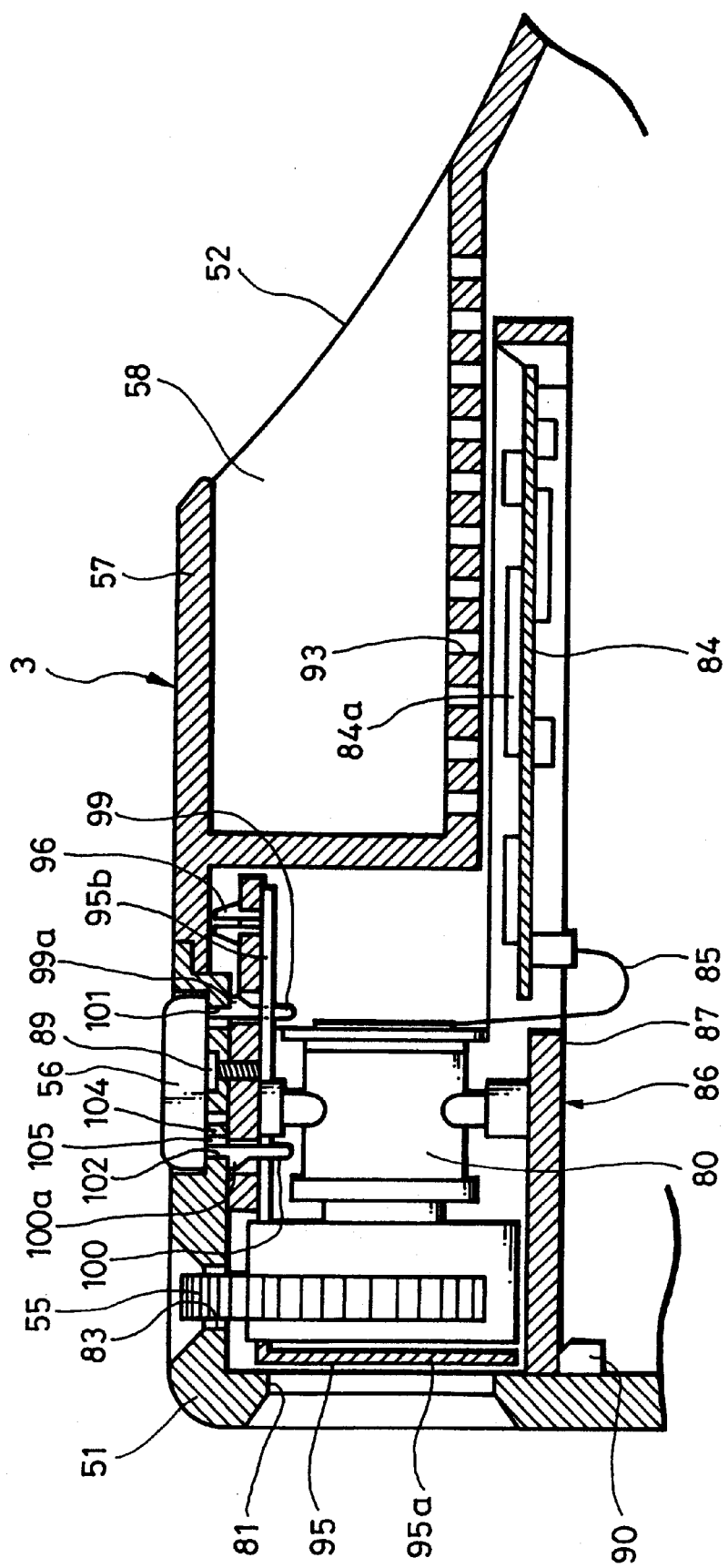
FIG. 9 is a longitudinally sectional side view of a video camera built in the video telephone.

FIG. 8 shows a structure of a tilt mechanism section for adjusting the tilt of the display block 3.

On the communication block 2 side, an upper portion of the upper housing 5 is formed with four recess portions 70 in total. These recess portions 70 are arranged two by two right and left at front and rear portions of the upper housing 5. A roller 71 is located in each of these recess portions 70. On the other hand, on the display block 3 side, a lower portion of the lower housing 53 thereof is formed with a circular-arc slip surface 72 which is abutted against the roller.

In a state that the circular-arc slip surface 72 is supported by means of the roller 71, the display block 3 is placed on the communication block 2. Specifically, when the circular-arc slip surface 72 slips on the roller 71, the display block 3 can be adjusted in tilt.

Also, in the tilt mechanism section, assembling engagement portions 73a and 73b formed on an upper portion of the upper housing 5 of the communication block 2 side are in mesh with engagement guide portions 74a and 74b formed on a lower portion of the lower housing 53 of the display block 3. Whereby the communication block 2 and the display block 3 can be assembled so that the former and the latter are not detached from each other.

Moreover, in the tilt mechanism section, a click mechanism 75 is interposed between the communication block 2 and the display block 3. The click mechanism 75 comprises a pawl-shaped elastic member 76 and a plurality of click recess portions 77. The elastic protrusion 76 is formed on a part of the upper housing 5 on the communication block 2 side. On the other hand, the plurality of click recess portions 77 are formed on a part of the slip surface 72 on the display block 3 side so as to correspond to a protrusion 76a formed on the tip end of the elastic member 76.

The protrusion 76a of the elastic member 76 elastically engages with any one of click recess portions 77 so that the display block 3 is lightly fixed. When the display block 3 is tilted, the aforesaid protrusion 76a of the elastic member 76 is successively engaged with adjacent click recess portions 77, and at this time, a preferable click feeling can be obtained.

Six click recess portions 77 are continuously formed at a pitch of 3°, for example. Thus, the display block 3 can be adjusted in tilt for each angle of 3°, and consequently, it can be adjusted in an angular range of 15° according to a five-step click.

According to this embodiment, the video telephone 1 constructed in the manner as described above comprises the communication block 2 having a telephone communication function and the display block 3 having a video function. Thus, the video telephone 1 is excellent in an assembling performance in manufacture and has the advantage of maintenance service in repairing. Moreover, the video telephone 1 can suitably cope with the problems with respect to noise and heat.

Also, in the video telephone 1, the display block 3 can be adjusted in tilt with respect to the communication block 2. Thus, the user can freely change the directions of the display screen 4 and the lens 54 of the video camera, so that the video telephone can be set to an optimum state. Therefore, it is very convenient for the user.

In addition, the tilt adjustment is carried out with a favorable click feeling, so that a comfortable operation feeling in the tilt adjustment is given to the user. Therefore, the video telephone 1 is easy to be used for the user.

In the video telephone 1 of this embodiment, the control panel 9 in which various operation buttons are provided is arranged on the front surface of the communication block 2 at a steep angle or the like so that a projection area can be reduced. Such an arrangement structure serves to miniaturize the video telephone 1 as a whole. Therefore, it is possible to readily locate the video telephone 1 on even a narrow place such as a desk, etc.

Further, in the video telephone 1, the operation buttons having high frequency in use are arranged on the center portion, and are formed larger than other buttons, so that the user can easily use these buttons. Also, the operation buttons having low frequency in use are usually housed and hidden in the communication block to prevent an erroneous operation; therefore, it is very convenient for the user.

Next, referring now to FIG. 9 to FIG. 12, a video camera built in the video telephone 1 of this embodiment will be explained below in its structure.

In the above figures, a reference numeral 80 denotes a video camera. The video camera 80 is a small-sized camera in which a solid state imaging device (CCD) is built-in, and the front surface side a lens 54 thereof is exposed outside through an opening 81 of the front surface housing 51 of the display block 3 so as to take a photograph of the user.

A focus adjustment of the lens 54 is performed by rotating an outer peripheral frame portion 82. The outer peripheral frame portion 82 is fitted with a focus ring 55. The focus ring 55 is exposed outside through an opening 83 formed through the front surface housing 51 so that a focus adjustment operation can be carried out from the outside.

A reference numeral 84 denotes an electronic circuit board for the video camera. A circuit mounted on the electronic circuit board 84 and an image pickup element built in the video camera are connected to each other by means of a flexible printed wiring board 85.

The video camera 80 and the electronic circuit board 84 are integrally mounted on a base frame body 87 so as to be constituted as a camera unit 86. Specifically, the video camera 80 is fixed on the base frame body, 87 by means of two screws 88; on the other hand, the electronic circuit board 84 is fitted into the base frame body 87 so as to be fixed thereon.

The camera unit 86 assembled in the above manner is attached to the front surface housing 51 by means of two screws 89. An inner side of the front surface housing 51 is formed with a protrusion 90 for restricting an attachment position of the camera unit 86. Also, an upper portion of the base frame body 87 of the camera unit 86 is provided with right and left positioning rod-like protrusions 91. An upper surface of the front surface housing 51 is formed with receiving holes 92 into which these protrusions 91 are respectively fitted.

More specifically, when assembling the camera unit 86 into the front surface housing 51, a front end portion of the base frame body 87 is hooked over the protrusions 90 of the front surface housing 51 while the rod-like protrusions 91 of the base frame body 87 being fitted into the receiving holes 92 formed through the front surface housing 51. By doing so, the camera unit 86 is suitably positioned, and then, in this state, the base frame body 87 is fixed to the front surface housing 51 by means of the screws 89.

Incidentally, in the state that the camera unit 86 has been assembled into the front surface housing 51, the electronic circuit board 84 is positioned beneath the recess portion 58 forming the hold portion 57 of the upper housing 52 situated in back of the front surface housing 51. This arrangement structure serves to obtain the following effect. Specifically, heat generated from an electronic component 84a mounted on the electronic circuit board 84 is effectively ventilated through a vent 93 formed through the bottom of the recess portion 58.

In addition to the construction as described above, the video telephone of this embodiment has a built-in lens opening and closing mechanism for opening and closing the lens 54 of the video camera 80.

The lens opening and closing mechanism comprises a lens cover 95, and an operation member 56 for operating the lens cover 95.

The lens cover 95 comprises a cover main section 95a covering the front surface of the lens 54, and an arm section 95b extending from one end of the cover main section 95a, which are integrated with each other. The lens cover 95 is attached to the base frame body 87 so as to swingable in a transverse direction by fitting a shaft 96 formed on an end portion of the arm section 95b into a hole 94 formed through the base frame body 87 of the camera unit 86. Further, the lens cover 95 is constructed so that the cover main section 95a is swingable between a position of entirely covering the lens 54 and a position of entirely opening the lens 54. Also, the cover main section 95a is formed into a circular-arc shape so as to correspond to a swing trace of the lens cover 95.

The arm section 95b is formed with an engagement opening 97 into which a leg, which will be described later, of the operation member 56 is inserted and fitted. The engagement opening 97 is located at a position nearer to the center of swing, that is, the shaft 96 than a portion of the lens cover 95 covering the lens, that is, the cover main section 95a. Specifically, a distance "b" between the engagement opening 97 and the shaft 96 is set so as to become smaller than a distance "a" from the cover main section 95a of the lens cover 95 to the engagement opening 91. In this case, the ratio of the distance "a" to the distance "b" is substantially 4:1.

Meanwhile, the operation member 56 is provided so as to be linearly movable along a recessed step portion 98 formed on the upper portion of the front surface housing 51. Further, the operation member 56 has a pair of legs 99 and 100 projecting from the lower surface side thereof. The paired legs 99 and 100 are formed with engaging pawls 99a and 100a, respectively.

The recessed step portion 98 of the front surface housing 51 is formed with guide slots 101 and 102 so as to correspond to these legs 99 and 100. In a state that legs 99 and 100 are respectively inserted into the guide slots 101 and 102, the engaging pawls 99a and 100a of the legs 99 and 100 engage with inner edges of guide slots 101 and 102, respectively. Whereby the operation member 56 is linearly movable along the guide slots 101 and 102 in a state that the operation member 56 is prevented from coming off from these guide slots 101 and 102.

Since one leg 99 of the operation member 56 is inserted and fitted into the engagement opening 97 of the lens cover 95, when moving the operation member 56, the lens cover 95 is swingable so as to open and close the lens 54 in cooperation with the movement of the operation member 56.

Figure 12A:
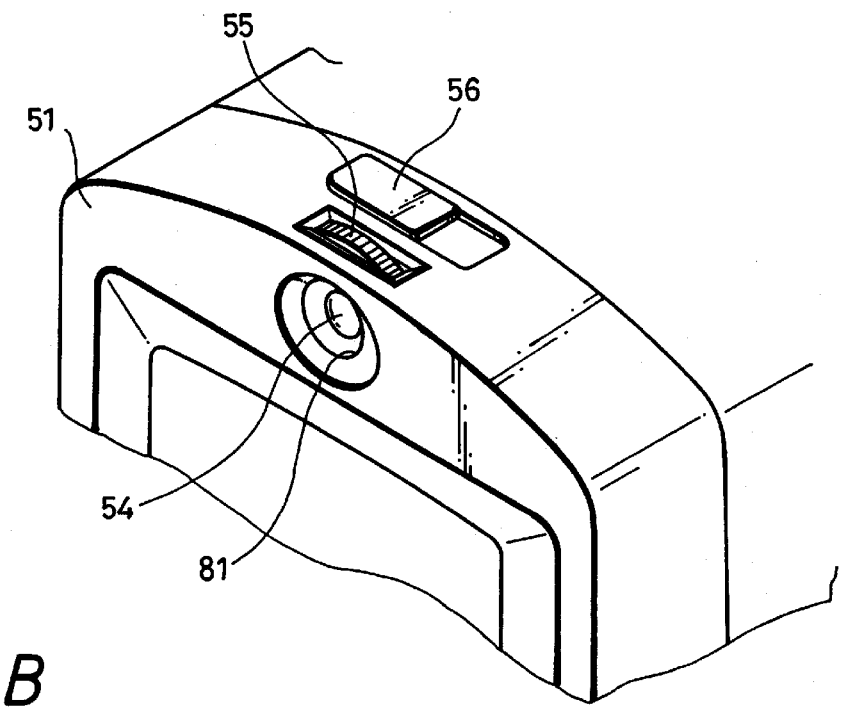
Figure 12B:
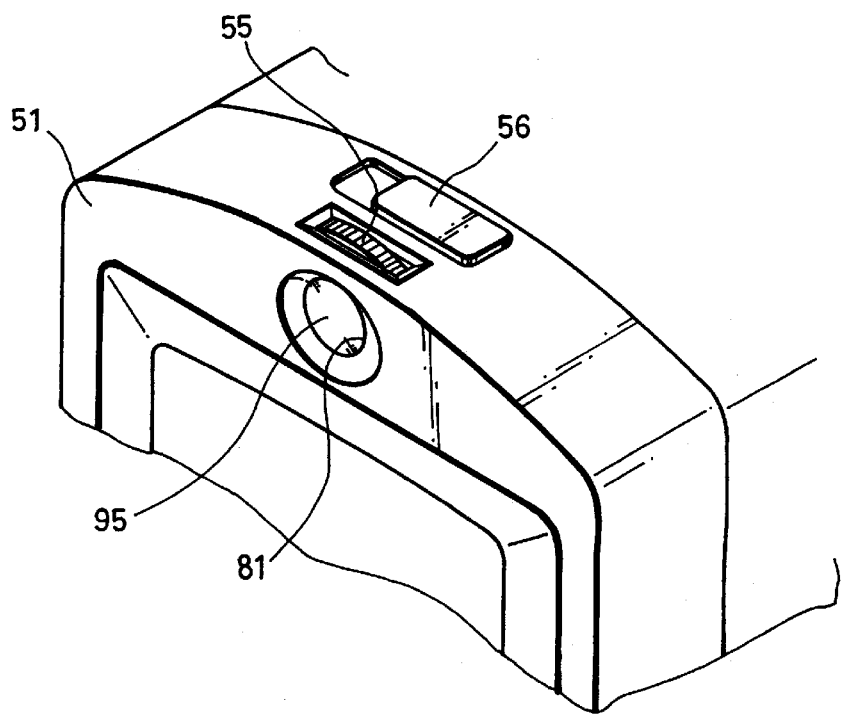

More specifically, as shown FIG. 12A, when the operation member 56 is situated on the left-hand side, the lens cover 95 is at a position of entirely opening the lens 54; therefore, the lens 54 is in an open state. As shown in FIG. 12B, when the operation member 56 is moved to the right-hand side from the aforesaid state, the lens cover 95 entirely covers the lens 54; therefore, the lens 54 is in a closed state.

In the aforesaid operation, a linear movement operation of the operation member 56 is converted into a swing operation of the lens cover 95 to open and close the lens 54; therefore, the operation can be smoothly performed. In this case, an engagement portion of the lens cover 95 with the operation member 56, that is, the engagement opening 97 is located on a position nearer to the shaft 96 than the cover main section 95a of the lens cover 95, so that the cover main section 95a of the lens cover 95 can be swingable with a larger stroke as compared with a movement operation stroke of the operation member 56.

In this embodiment, the ratio of the distance "a" between the cover main section 95a of the lens cover 95 and the engagement opening 97 to the distance "b" between the engagement opening 97 and the shaft 96 is set to substantially 4:1. Thus, the cover main section 95a of the lens cover 95 is swingable with a four times or more stroke as much as the movement operation stroke of the operation member 56. Conversely, the movement operation stroke of the operation member 56 is less than one fourth of the swing stroke of the lens cover 95 required for opening and closing the lens 54, so that the lens 54 can be opened and closed by a minimum movement operation stroke.

Also, in this embodiment, a photo interrupter 103 is located on the base frame body 87 of the camera unit 86. The photo interrupter 103 detects a swing position of the lens cover 95, and automatically turns off a video signal of the video camera 80 in a state that the lens 54 is closed.

Moreover, in the structure of this embodiment, a click mechanism is located between the front surface housing 51 and the operation member 56. The click mechanism includes a wave-like flexible portion 104 which is formed integrally with the front side housing 51 in the guide slot 102 of the front surface housing 51, and a click convex portion 105 projected from the leg 100 of the operation member 56. The click convex portion 105 is engaged with a recess portion of the wave-like flexible portion 104 so that the operation member 56 is lightly fixed at the positions where the lens 54 is opened and closed.

In the movement operation of the operation member 56, the click convex portion 105 is moved so as to go beyond a projected portion of the wave-like flexible portion 104, and at this time, a favorable click feeling can be obtained.

As is evident from the above description, the lens opening and closing mechanism opens and closes the lens 54 with a minimum stroke of the operation member 56; therefore, it is excellent in operability. Moreover, since the operation is performed with a favorable click feeling, an operation feeling is improved, and it is convenient in use for the user.

The aforesaid lens opening and closing mechanism is composed of two components, that is, the lens cover 95 and the operation member 56; therefore, the mechanism can be readily assembled and carried out with a simple structure, and there is almost no possibility that a failure occurs.

The click mechanism in the lens opening and closing mechanism takes advantage of parts of the front side housing 51 and the operation member 56, and has an extremely simple structure. Therefore, the click mechanism can be carried out at a low cost without increasing the number of components.

Figure 10:
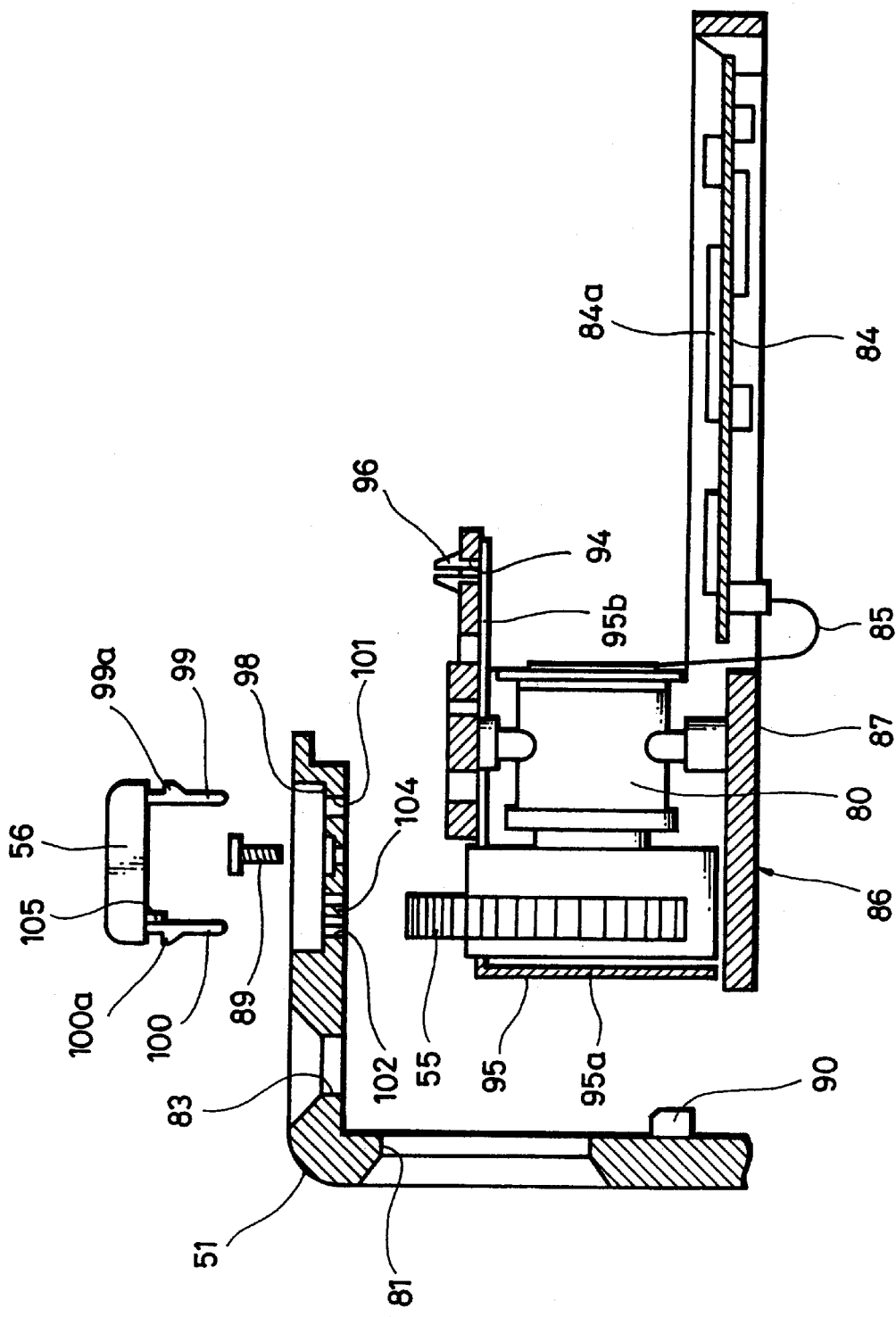
FIG. 10 is a view showing a state in which a camera unit is detached.
Figure 11:
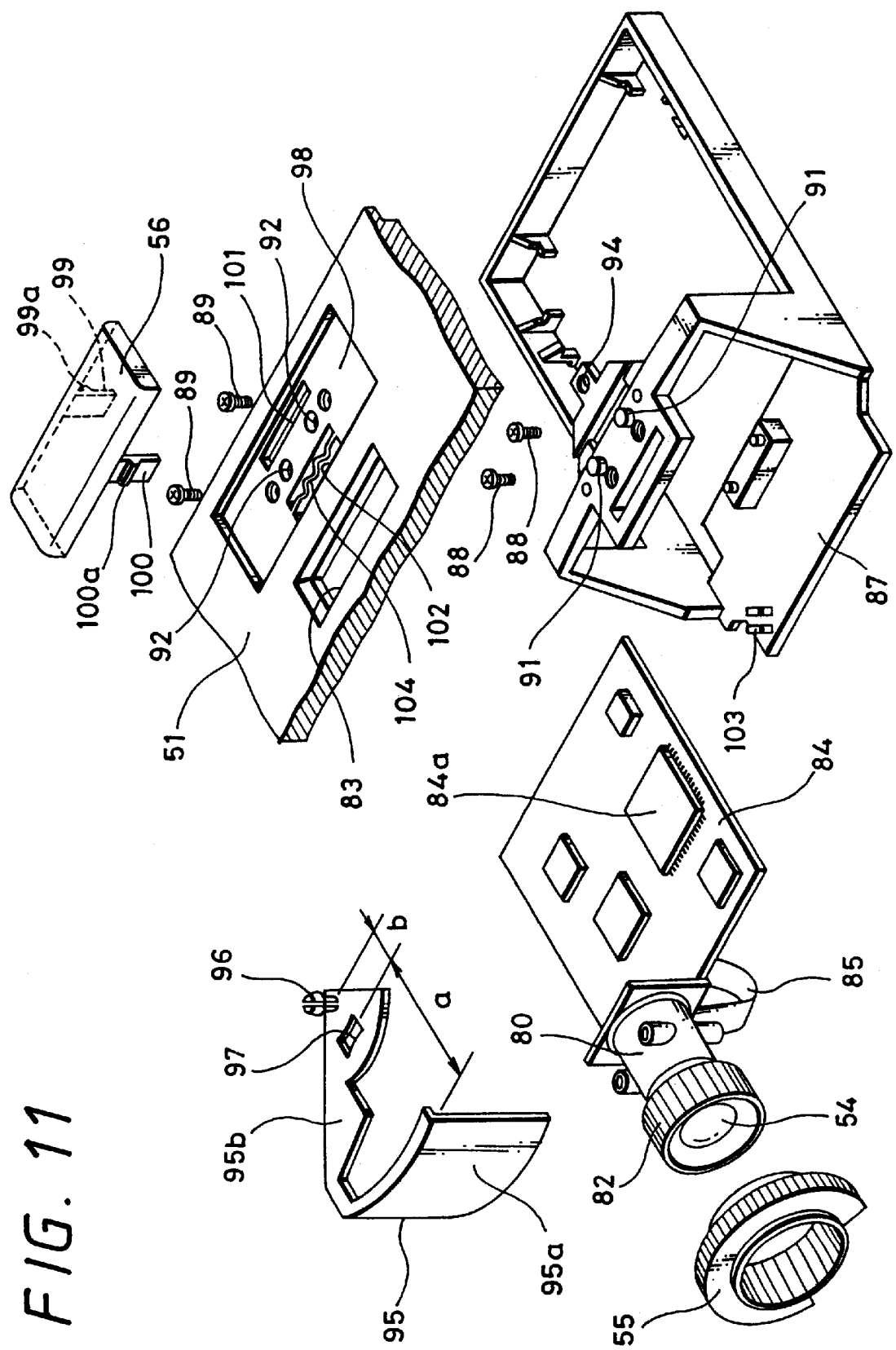
FIG. 11 is an exploded perspective view of the camera unit.

In the structure of this embodiment, it is possible to readily detach the camera unit 86 of the display block 3 upon repairing or the like. Specifically, when taking out the camera unit 86, first, the upper housing 52 situated on the rear of the display block 3 is detached, and in this state, the operation member 56 and the screw 89 are taken out as shown in FIG. 10. By doing so, the camera unit 86 can be readily detached from the front surface housing 51 and taken out to the outside.

Also, since it is possible to readily detach the video camera 80 of the camera unit 86, the electronic circuit board 84 and the lens cover 95 from the base frame body 87, it is convenient for repair and exchange.

The above was explained about the preferred embodiment of the present invention. The present invention is not limited to the aforesaid embodiment, and various changes and modifications can be effected.

The video telephone of the present invention has a two-block structure including the communication block having a telephone communication function and the display block having a video function. Therefore, the video telephone of the present invention is easy to assemble and has the advantage of being easy to be serviced. Moreover, the video telephone of the present invention can suitably cope with the problems with respect to noise and heat.

In this video telephone, since the display block can be adjusted in tilt with respect to the communication block, the user can freely change the directions of the display screen and the video camera, and then, can set the video telephone to an optimum state. Therefore, it is very convenient in use for the user.

In addition, the tilt adjustment is carried out with a click feeling, so that a preferable operation feeling can be obtained, and the user can more easily operate the video telephone.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A video telephone having a video telephone function, comprising:
    a communication block having a telephone communication function and including a top concave surface; and
    a display block including a bottom convex surface adapted to be mounted on said top concave surface of said communication block, said display block having a video function by including a display screen, and a camera having a lens, wherein said display block is adapted to be tilted with respect to said communication block by a cooperation between said top concave surface of said communication block and said bottom convex surface of said display block, and
    said bottom convex surface of said display block includes:
        a plurality of engagement guide portions, and
        a plurality of click recess portions, wherein said plurality of click recess portions includes six click recesses continuously formed at a pitch of 3° so that said display block can be tilted 15° with respect to a vertical plane, and
    said top concave surface of said communication block includes:
        a plurality of recess portions adapted to receive a respective plurality of rollers, said plurality of rollers contacting said bottom convex surface,
        a plurality of engagement portions adapted to engage said plurality of engagement guide portions so that said communication block is slidably attached to said display block, and
        a pawl-shaped elastic member for engaging said plurality of click recess portions so that said display block slides on said communication block in discrete steps when said display block is tilted.

2. The video telephone according to claim 1, wherein said camera is located in an upper portion of said display block.

3. The video telephone according to claim 2, further comprising a lens cover mechanism for opening and closing said lens of said camera.

4. The video telephone according to claim 1, further comprising a plurality of operation buttons located below said display screen of said communication block.

5. The video telephone according to claim 1, further comprising a telephone keyboard installed on a front surface of said communication block, wherein said front surface forms an angle of about 45° with a horizontal plane.

6. The video telephone according to claim 4, further comprising a photo interrupter connected to said lens cover mechanism so that when said lens is closed by said lens cover mechanism said camera is turned to an off state.

* * * * *